Feb. 25, 1941.                M. SEIDEL                    2,232,737
           PROCESS FOR RECOVERING VOLATILE SUBSTANCES FROM
                      FERMENTATION WASTE GASES
                       Filed March 22, 1938
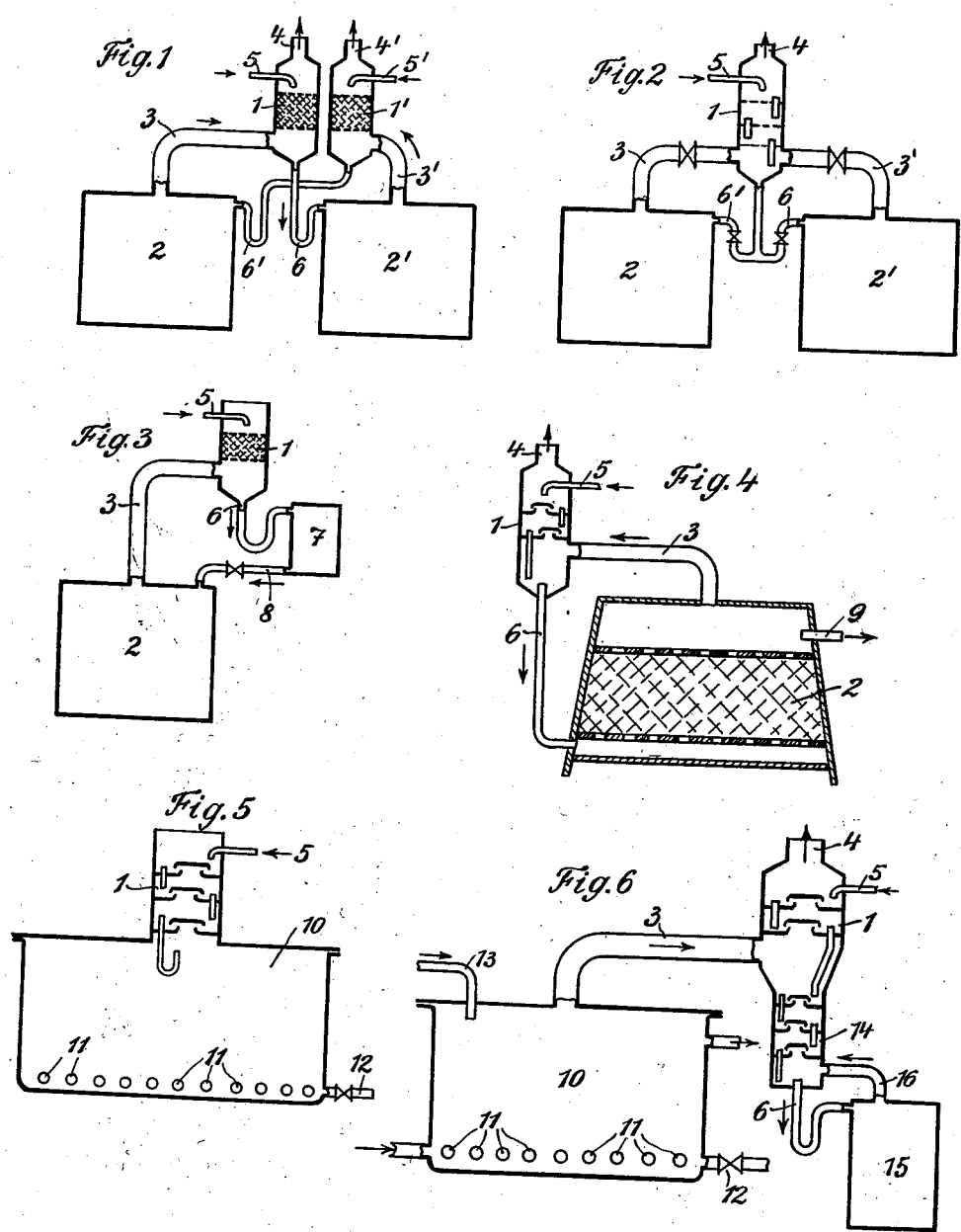
Inventor:
Max Seidel Patented Feb. 25, 1941

2,232,737

UNITED STATES PATENT OFFICE 2,232,737

PROCESS FOR RECOVERING VOLATILE SUBSTANCES FROM FERMENTATION WASTE GASES

Max Seidel, Solln, near Munich, Germany

Application March 22, 1938, Serial No. 197,393
In Germany March 31, 1936

4 Claims. (Cl. 195—83)

This invention relates to processes for recovering volatile substances from the spent air produced in the culture of yeast and other micro-organisms.

In alcoholic fermentations the carbonic acid which escapes from the fermentation vessel and contains alcohol is frequently conducted through water in order to absorb the alcohol which is contained in it and then to recover the alcohol from the water by distillation.

Processes are also known in which the waste gases from fermentation processes, for example, those obtained in the production of acetic acid, are passed through solutions which have not yet been fermented in order to absorb and thereby recover the volatile substances which are produced in the fermentation and of which a small proportion is carried away by the fermentation waste gases.

In the culture of yeast and other micro-organisms, however, no attempt has yet been made to obtain the volatile substances contained in the air necessary for the fermentation. The main products of the process, namely, yeast and like micro-organisms, are indeed not volatile and the volatile by-product, principally alcohol, is present only in very low concentrations which, in general, are below 1% by volume. Owing to the very large quantities of air which are conducted through the solutions in the production of yeast and the like, the quantity of waste gas from which the recovery has to be effected is very much greater than in an alcohol fermentation and, owing to the extremely low content of alcohol in the liquid, the alcohol concentration in the fermentation waste gases is so low that recovery has not hitherto been attempted. Since, however, if the intensity of aeration and the time of fermentation are suitably regulated and good yields obtained, the recovery of the volatile substances which escape with the waste gases is a considerable advantage.

In accordance with the present invention, the fermentation waste air after escaping from the fermentation vessel is conducted through separate apparatus, preferably column apparatus, in counterflow to a large amount of unfermented liquid, the quantity of which is preferably proportional to the quantity of waste air escaping from the fermentation vessel in the same time.

The counterflow exchange between the fermentation waste air and fresh wort can take place in a plurality of carbonic acid scrubbers of the kind used in the recovery of alcohol from the waste gases from alcoholic fermentations through which the waste air from the fermentation flows in succession.

Since the wort, need not be enriched with alcohol until it is saturated (with respect to the alcohol content of the waste gases) because there is no increase in the quantity of liquid to be distilled, column apparatus having only a few plates or bottoms are sufficient and, in the limiting case, when the whole of the wort or mash which is to undergo fermentation or an equivalent amount of fresh wort or mash is used as the washing liquid a single absorption bottom may be sufficient.

In the case of continuous and semi-continuous processes for the culture of micro-organisms, for example, yeast, the whole of the wort or mash can be conducted to the fermentation vessel after it has absorbed in the washing column the alcohol contained in the fermentation waste gases. In the case of discontinuous fermentation processes the whole of the wort or mash which has absorbed in a washer or washing column the alcohol contained in the fermentation-air from one fermentation vessel is used for charging another fermentation vessel in which it acts as a nutrient solution either alone or together with nutrient solution either alone or together with fresh mash or wort which has not been used as a washing liquid. Also the wort which has been enriched with alcohol in the washing apparatus can be stored and employed later, for example for charging the fermentation vessel from which the waste air, the alcohol in which was absorbed in the washing apparatus, originated.

Instead of conducting the whole of the wort or mash to be fermented through the washing apparatus, in some cases a part only may be conducted through the washing apparatus while the remaining part is supplied directly to the fermentation vessel or vessels.

The new process can also be used, for example, for the recovery of alcohol from the waste air in the production of yeast by the aeration process with simultaneous production of alcohol.

Example 1

In a process for the culture of micro-organisms in which the material is fermented in separate batches, the alcohol-containing fermentation waste air which escapes from the fermentation vessel is conducted through an absorption apparatus, which may be a scrubber or column apparatus, in which it gives up its alcohol and/or other volatile liquids more or less completely to a part of the unfermented mash or wort which is to be charged to a second fermentation vessel. The unfermented mash or wort, after being enriched with the volatile substances, flows from the absorption apparatus to a second fermentation vessel which is to be freshly charged, namely either simultaneously with the remainder of the unfermented mash or wort required for charging the vessel or before or after the remainder of the charge. However, the whole of the wort or mash to be conducted to the second fermentation vessel can also be first conducted through the absorption apparatus for the fermentation waste gases from the first fermentation vessel. The wort which is conducted to the second fermentation vessel and has already been slightly enriched with alcohol and/or with other volatile substances is then fermented with the simultaneous production of yeast and alcohol. The alcohol content after the fermentation is then as high as if no evaporation and absorption of alcohol by the fermentation waste gases had occurred, since the new fermentation waste gases carry with them from the fermentation vessel the same amount of alcohol and other volatile substances as the wort had previously taken up in the absorption apparatus. The quantity of wort or mash to be distilled is no greater than in a process operating without recovery of the alcohol contained in the fermentation waste gases. When there is only a single fermentation vessel the unfermented mash or wort which is enriched with alcohol in the absorption apparatus can also be stored in a storage vessel until the fermentation vessel is ready to be recharged.

*Example 2*

In a continuous fermentation process, in which a continuous supply of unfermented wort and a continuous withdrawal of fermented wort takes place, the fermentation waste gases are suitably conducted through an absorption apparatus in which the alcohol and/or other volatile substances contained in them is given up more or less completely to the whole or to a part of the unfermented wort which flows to the fermentation vessel. In this case also the unfermented wort which is used as the washing liquid can be conducted in some cases to a fermentation vessel other than that from which the fermentation waste gases are derived or it can be temporarily stored in a storage vessel and conducted later into the same or into another fermentation vessel.

*Example 3*

In special cases, when, as in Examples 1 and 2, only a part of the unfermented mash or wort which is supplied to the fermentation is conducted through the absorption apparatus for the fermentation waste gases or for the volatile liquids contained in the fermentation waste gases this part can be fermented separately. The process can be carried out in this manner, in particular, when very thin mashes or worts are fermented, for example in the aerobic fermentation of yeast with or without simultaneous recovery of alcohol, in the fermentation of sulphite waste liquors, wood-sugar worts and other solutions which are strongly diluted. The separately fermented parts of these mashes or worts, owing to their previous enrichment with alcohol, then have a higher content of alcohol, after fermentation namely up to double that of the fermented main portion of the mash or wort. In aerobic fermentation of yeast the alcohol can be obtained in this way by vigorous aeration of the wort and can be accumulated in a part of the wort which can easily be distilled. The alcohol content of the main portion of the wort which is used for the yeast culture remains small which is favorable to the growth of the yeast. The wort which is used as the absorption liquid, which may have a higher or an entirely different content of extract from that of the main part of the wort, can in some cases also be fermented separately from the main quantity of the wort. Since the increase in the alcohol content of the wort by the absorption of the alcohol in the air from the fermentation vessels amounts only to a fraction of the total alcohol content, for example in the production of equal quantities of alcohol and pressed yeast to about 10% of the alcohol content according to the degree of aeration, i. e. 0.1%, and consequently the impairment of the growth of the yeast is small, the yeast culture can be carried out in accordance with Example 1 or 2. If the aeration is intensified the yield of yeast can be increased without any appreciable loss of alcohol.

It is also possible to recover volatile substances from other kinds of fermentation processes by the new process. For example the various volatile acids, higher alcohols, acetone, aldehydes and so forth and other substances of a volatile nature which are obtained by fermentation processes using different micro-organisms and which are already contained in part in the solutions to be fermented. Many of these substances evaporate particularly easily owing to the minimum boiling points of their mixtures with the water of the fermentation solutions, even if their boiling points are higher than that of water.

A particular advantage of the new process is that the washing column can be smaller than the carbonic acid scrubbers hitherto employed, because the washing liquid need not be accumulated for a considerable time in the absorption apparatus in order to reduce the quantity of washing liquid as far as possible.

Referring now to the drawing:

Figures 1 to 6, inclusive, diagrammatically illustrate several embodiments of apparatus which can be used in accordance with the principles of this invention.

In the drawing like reference numerals designate like parts.

Referring now to Figure 1, the reference numerals 1 and 1' designate two absorption devices respectively, each of which is in the form and shape of column apparatus provided with appropriate fillers. The absorption device 1 is appropriately connected to a fermentation vat 2 of any known kind, through the medium of the pipe 3 whereby the waste fermentation gases from vat 2 may be conducted to the absorption device 1. The absorption device 1 is also provided with an outlet 4, preferably in the top thereof, whereby the fermentation waste gases may pass therefrom. Means are provided at any convenient place, such as at 5, whereby the fresh wort which serves as absorption liquid for the alcohol content of the fermentation waste gases can be introduced into the absorption device 1. The absorption device 1 is connected to the fermentation device 2' through the medium of the line 6 whereby the absorption liquid after having taken up the alcohol content of the fermentation waste gases is conducted to the fermentation vessel 2'.

The absorption device 1' is similarly provided with a fermentation waste gas outlet 4', an inlet 5' through which the absorption liquid is introduced into the device, and an outlet connected to the fermentation vat 2 through the medium of the line 6'.

In operation the fermentation waste gases pass from the fermentation vessel 2 through the pipe 3 to the absorption device 1 and leave the absorption device 1 at 4. At the same time fresh wort serving as a washing liquid (absorption liquid) is introduced at 5 and flows downwardly through the absorption device 1 and the pipe 6 to the fermentation vessel 2' that is to be filled. When the fermentation in vessel 2 is completed and the vessel 2 has been emptied, fermentation is started in vessel 2'. In this instance, the fermentation waste gases pass from the vat 2' to the absorption column 1' through the pipe 3'. The gases leave the absorption column 1' through the outlet 4'. At the same time fresh wort, which constitutes the absorption liquid, is introduced through the inlet 5'. This absorption liquid flows downwardly through the absorption column 1 and passes therefrom through the pipe 6' to the vat 2. The process is repeated as many times as desired.

Instead of two fermentation vats, a greater number may be used, in which event they may be connected in any suitable manner, as, for example, in series.

In place of using two absorption devices, one absorption device may be used. Such an arrangement is shown in Figure 2.

Referring now to Figure 2, the absorption device 1 is connected to the fermentation vats 2 and 2' through the lines 3 and 3' respectively. The absorption device 1 is provided with an outlet 4 and an inlet 5 through which the fresh wort (absorption liquid) is introduced. The absorption liquid passes from the absorption device 1 through a line which has branches 6 and 6' appropriately connected to the fermentation vats 2 and 2'. The lines 3, 3', 6 and 6' are provided with valves for reasons which will become apparent from the description of the operation of the apparatus.

In operation, assuming that fermentation has been effected in vat 2, the valves in lines 3' and 6' are in closed position, and the valves in lines 3 and 6 are in open position. The fermentation waste gases from the fermentation vat 2 pass into the absorption device 1 through the line 3 and leave the absorption device 1 through the outlet 4. At the same time fresh wort is introduced through the inlet 5 and it flows downwardly in through the absorption device 1 and the line 6 conducts it from the absorption device to the fermentation vat 2'. After the fermentation in vat 2 has been completed and the vat has been emptied, the valves in lines 3 and 6 are closed and the valves in lines 3' and 6' are opened. The process is then carried out in the manner previously described in connection with fermentation vessel 2.

Figure 3 diagrammatically illustrates still another embodiment of the apparatus. In this embodiment a storage tank 7 is positioned in the liquid discharge line 6 leading from the absorption device 1 to the vat 2. It is to be noted that in the outlet line 8 from the storage tank 7 to the vessel 2 there is provided a valve. In operation the valve in line 8 is closed and fermentation is effected in the vessel 2 with the result that the fermentation waste gases pass into the absorption device 1 through the line 3. As in the preceding embodiments, the fermentation waste gases leave the absorption device 1 through the outlet 4 and fresh wort is introduced through the inlet 5. The wort after flowing through the absorption device 1 is conducted therefrom by the line 6 to the storage tank 7. When the fermentation in vessel 2 has been completed and the vessel has been emptied, the valve in line 8 is opened, whereby the liquid collected in the tank 7 is introduced into the fermentation vessel 2 and the process repeated as previously described.

The preceding embodiments of the apparatus constituting one phase of this invention were intermittently or batch operated. The invention also contemplates continuous operation of the apparatus whereby continuous methods are secured.

Figure 4 discloses an apparatus which can be used in connection with a continuous fermentation process such as, for example, the so-called Fessel yeast process.

The Fessel yeast process is one in which the yeast settles on large surface objects inserted in the fermenting tank, and is disclosed in German Patents Nos. 340,460, 340,904, 348,285, 348,286, 414,837, and also in Foth Handbuch der Spiritusfabrikation, 1929, page 495, published by Paul Parey, Berlin SW 11.

Referring now to Figure 4, the absorption device 1 is connected to the fermentation vessel 2 by the pipe 3. As in the preceding embodiments, the absorption device 1 is provided with a waste gas outlet 4, an inlet 5 whereby the wort to be fermented is introduced into the absorption device 1, and an outlet pipe 6 which conducts the wort from the absorption device 1 to the fermentation vat 2. In this embodiment the fermentation vat 2 is provided with an outlet 9 whereby the fermented liquid is conducted to, for example, a distilling apparatus. In this embodiment the fermentation waste gases are conducted from the vat 2 to the absorption device 1 through the line 3. The gases pass upwardly through the absorption device 1 and pass therefrom through the outlet 4. In their passage upwardly the fermentation waste gases contact with the wort to be fermented and are introduced through the inlet 5, the wort thereby becoming enriched with alcohol from the fermentation waste gases. The enriched wort passes downwardly and is conducted from the absorption device 1 to the fermentation vessel 2 through pipe 6. By means of the outlet 9 the fermented material passes from the fermentation vessel 2 to any suitable apparatus such as, for example, a distilling apparatus. It is to be noted that the process is continuous.

Figure 5 discloses still another embodiment of the apparatus. More particularly, the apparatus shown in Figure 5 discloses an absorption device 1 appropriately connected to a yeast adding vessel 10 operated according to the continuous supply process. In this embodiment the absorption device 1 is placed directly on the cover of the fermentation vessel 10 and in communicative relationship with the vessel 10. Vessel 10 is also provided with means 11 whereby air may be blown into the interior of the vessel. In operation a nutrient solution is introduced into the absorption device 1 through the inlet 5. As the nutrient solution flows downwardly through the absorption device 1 it is enriched with alcohol and other volatile substances from the fermentation waste gases passing to the absorption device 1 from the vessel 10. The enriched nutrient solution passes into the fermentation vessel 10 in the form of feed wort. When the fermentation has been completed the substance filling the vessel 10 is discharged through the outlet 12.

Figure 6 shows an embodiment of an apparatus wherein the absorption device is used in combination with a yeast cultivating vat and in which apparatus the alcohol content is transferred to a separate portion of the wort that is to be fermented, for example, for the production of alcohol, while a nutrient solution not enriched with alcohol or other volatile substances is fed to the fermentation vessel for the cultivation of yeast.

In this embodiment of the invention a nutrient solution not enriched with alcohol or other volatile substances is fed to the fermentation vessel 10 for the cultivation of yeast through the inlet 13. The fermentation waste gases from the vat 10 pass through the pipe 3 into the absorption device 1 where said gases after surrendering their alcohol content or volatile substances, escape through the outlet 4. The wort absorbing the alcohol content of the waste gases is introduced, through the inlet 5, into the absorption chamber and flows through the latter and the absorption admixture column 14. Thereafter it is fed by the way of the pipe 6 into the fermenting vessel 15 in order to be further processed for the production of micro-organisms, e. g., yeast and the production of products of fermentation, such as alcohol. The waste gases from the fermentation vessel 15 are, especially in the production of products of fermentation, richer in volatile substances than those in the gases escaping from vessel 10 and they pass through the pipe 16 into the absorption mixture column 14 in which they surrender part of their content of volatile substances to the fresh wort and flow together with the waste gases from the fermentation vessel 10 through the absorption device 1, there to surrender additional volatile substances contained in them to the absorbing fresh wort. It is to be noted that the vessel 10 is provided with means 11 to blow air thereinto.

I claim:

1. A process which comprises absorbing at least the alcohol contained in the waste air obtained in the aerobic fermentation of yeast with a nutrient solution, and utilizing the resultant nutrient solution containing the absorbed alcohol for the cultivation of yeast.

2. A process which comprises passing the waste air containing alcohol obtained in the aerobic fermentation of yeast and a nutrient solution in counter-flow relationship through an absorption apparatus, and utilizing the resultant nutrient solution containing the absorbed alcohol for the cultivation of yeast.

3. A process which comprises absorbing at least the alcohol contained in the waste air obtained in the aerobic fermentation of yeast with a nutrient solution, and conducting the resultant nutrient solution containing the absorbed alcohol to the fermentation vessel from which the waste air originated and there aerobically fermenting said resultant nutrient solution for the cultivation of yeast.

4. A process which comprises passing the waste air containing alcohol obtained in the aerobic fermentation of yeast and a nutrient solution in counter-flow relationship through an absorption apparatus, and conducting the resultant nutrient solution containing the absorbed alcohol to the fermentation vessel from which the waste air originated and there aerobically fermenting said resultant nutrient solution for the cultivation of yeast.

MAX SEIDEL.